UNITED STATES PATENT OFFICE 2,256,958

QUATERNARY AMMONIUM HYPOHALITES AND METHOD OF MAKING SAME

Irving E. Muskat, Akron, Ohio, assignor to Pittsburgh Plate Glass Company, Allegheny County, Pa., a corporation of Pennsylvania No Drawing. Application May 13, 1939,
Serial No. 273,551

15 Claims. (Cl. 260—570.9)

This invention relates to compounds containing active chlorine which may be prepared from organic ammonium hydroxides and is particularly directed to the compounds derived from lower aliphatic, aryl aliphatic and araliphatic quaternary ammonium hydroxides. In accordance with my invention, I have found that compositions of high active chlorine content may be prepared by interaction of organic ammonium hydroxides with a hypohalite such as hypochlorous acid, hypobromous acid, hypoiodous acid, or with a halogen such as chlorine, bromine, iodine, or other halogenating agent. The product of this reaction is termed the corresponding hypohalite of the organic ammonium hydroxide.

Products of particular desirability have been prepared from quaternary ammonium hydroxides such as tetramethyl ammonium hydroxide, trimethyl phenyl ammonium hydroxide, trimethyl benzyl ammonium hydroxide, tetra ethyl ammonium hydroxide, triphenyl methyl ammonium hydroxide or other ammonium base in which the hydrogens in the ammonium radicle have been replaced by aliphatic aryl, araliphatic or aryl radicles such as the methyl, ethyl, propyl, propenyl, hydroxy propyl, hydroxy ethyl, cresyl, phenyl, benzyl, naphthyl, or similar radicle. Due to the fact that the quaternary ammonium hydroxides are strong bases, the preparation of the corresponding hypochlorites or active chlorine derivatives in stable form may be effected without difficulty by interaction with a hypohalogenous acid such as hypochlorous acid. The products so produced are found to be very stable, particularly in aqueous solutions, over a period of many months. The compounds herein contemplated are believed to have the following structural formula:

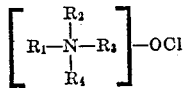

where $R_1$ represents a hydrocarbon or substituted hydrocarbon radical and $R_2$, $R_3$ and $R_4$ represent hydrogen or hydrocarbon or substituted hydrocarbon radical.

Other hypochlorites may be prepared by treatment of mono, di- or tri- substituted ammonium hydroxide such as triphenyl ammonium hydroxide, trimethyl ammonium hydroxide, mono methyl, mono ethyl, or mono propyl ammonium hydroxide, dicresyl, diphenyl, dibenzyl or dinaphthyl ammonium hydroxide or similar organic ammonium hydroxide with a hypohalogen.

The products prepared in accordance with the present invention are very soluble in water and are stable in aqueous solutions over periods of many months. They are capable of wide use as antiseptic, sterilizing or germicidal agents. In general, it is found desirable to prepare the products by neutralization with an aqueous solution of hypochlorous acid or other hypohalogenous acid. However, the materials may be prepared by treating an aqueous solution of the hydroxide with a halogen such as chlorine, bromine or iodine by treating with salts of hypochlorites such as calcium or sodium hypochlorite or with other chlorinating or halogenating agent.

The products are generally prepared in an aqueous medium and, in general, the resulting solutions are used as such without recovery of the pure hypochlorite. Since the hypochlorites prepared in accordance with this invention are very soluble in water, solutions having an active chlorine content as high as 200–500 grams per liter may be prepared without difficulty. In general, it is found, however, that the more dilute solutions, containing 25–50 grams per liter of active chlorine, thereof, are somewhat more stable.

The following examples are illustrative.

Example I 30 liters of a cold solution containing 43.8 grams per liter of HOCl was slowly added to 25 liters of an aqueous solution of cold tetramethyl ammonium hydroxide which contained 99.8 grams of the hydroxide per liter. The mixture was agitated during the addition. The resulting solution contained 31.6 grams of active chlorine per liter and 2.7 grams per liter of excess tetramethyl ammonium hydroxide. The solution lost no substantial amount of active chlorine over a period of several months. This solution is thought to be a solution of a hypochlorite of the tetramethyl ammonium hydroxide having the following probable formula:

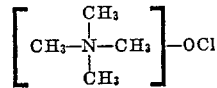

Example II 75 liters of a cold solution containing 43.8 grams per liter of HOCl was slowly added with stirring to 25 liters of a cold solution of trimethyl benzyl ammonium hydroxide containing 381 grams per liter of the hydroxide. The resulting solution contained 42.0 grams per liter of active chlorine and 7.5 grams of excess hydroxide. It was stable and lost no substantial amount of If desired, the hypochlorites may be prepared by treatment with chlorine and in such a case some of the hydroxide may be converted into the corresponding chloride. In order to prevent this the chlorination may be conducted in the presence of an alkali metal or alkaline earth metal hydroxide, whereby the organic ammonium hypochlorite is almost entirely converted into a hypochlorite, the alkali metal or alkaline earth metal chloride forming in preference to the substituted ammonium chloride. Sodium, calcium or lithium hydroxide may be used for this purpose.

Although the present invention has been described with reference to the specific details of certain embodiments thereof, it is not intended that such details shall be regarded as limitations upon the scope of the invention except insofar as included in the accompanying claims.

The expression "active chlorine" or "active halogen" as used in the specification and claims means chlorine or halogen, as the case may be, available for effecting an oxidation or bleaching reaction.

I claim:

1. A hypohalite of a compound of the group consisting of lower aliphatic, araliphatic and aryl-aliphatic quaternary ammonium hydroxides.
2. A hypochlorite of a compound of a group consisting of lower aliphatic, araliphatic and aryl-aliphatic quaternary ammonium hydroxides.
3. Trimethyl benzyl ammonium hypochlorite.
4. Trimethyl benzyl ammonium hypohalite.
5. Tetramethyl ammonium hypohalite.
6. A method of preparing a halogen derivative of a trimethyl phenyl ammonium hydroxide containing a substantial quantity of active chlorine which comprises halogenating an aqueous solution thereof.
7. A hypohalite of a compound of the group consisting of lower aliphatic, araliphatic and aryl-aliphatic quaternary ammonium hydroxides characterized by the fact that a substantial portion of the chlorine in said hypohalite is present as active chlorine.
8. Tetramethyl ammonium hypochlorite.
9. A method of preparing a halogen derivative of a compound of the group consisting of lower aliphatic, araliphatic and aryl-aliphatic quaternary ammonium hydroxides containing a substantial quantity of active halogen which comprises halogenating an aqueous solution thereof until a substantial portion of the hydroxide group is neutralized.
10. A method of preparing a halogen derivative of a compound of the group consisting of lower aliphatic, araliphatic and aryl-aliphatic quaternary ammonium hydroxides containing a substantial quantity of active halogen which comprises reacting said hydroxide with sufficient hypohalous acid to neutralize a substantial portion of said hydroxide.
11. A method of preparing a chlorine derivative of a compound of the group consisting of lower aliphatic, araliphatic and aryl-aliphatic quaternary ammonium hydroxides containing a substantial quantity of active chlorine which comprises reacting said hydroxide with sufficient hypochlorous acid to neutralize a substantial portion of the hydroxide.
12. A method of preparing a halogen derivative of tetramethyl ammonium hydroxide containing a substantial quantity of active halogen which comprises halogenating an aqueous solution thereof until a substantial portion of the hydroxide is neutralized.
13. A method of preparing a chlorine derivative of tetramethyl ammonium hydroxide containing a substantial quantity of active chlorine which comprises reacting said hydroxide with sufficient hypochlorous acid to neutralize a substantial portion of the hydroxide.
14. A method of preparing an organic ammonium hypochlorite which comprises chlorinating an aqueous solution of a compound of the group consisting of lower aliphatic, arylaliphatic and araliphatic quaternary ammonium hydroxides in the presence of an hydroxide of a metal of the group consisting of alkali and alkaline earth metals until a substantial portion of said ammonium hydroxide is neutralized.
15. Trimethyl phenyl ammonium hypochlorite.

IRVING E. MUSKAT.